United States Patent [19]
Jou

[11] Patent Number: 5,832,974
[45] Date of Patent: Nov. 10, 1998

[54] VERSATILE AIR BLOW-GUN

[76] Inventor: Wuu-Cheau Jou, No. 95, Cheng Kung 2nd Rd., Tai Li City, Taichung Hsien, Taiwan

[21] Appl. No.: 802,691

[22] Filed: Feb. 19, 1997

[51] Int. Cl.⁶ ...................................................... B65B 1/04
[52] U.S. Cl. ........................... 141/392; 141/38; 239/600; 239/291
[58] Field of Search ........................... 141/382, 387–389, 141/392, 38, 37; 239/600, 587.1, 290, 291, 428.5; 285/322, 323; 137/223, 231

[56] References Cited

U.S. PATENT DOCUMENTS

| | | | |
|---|---|---|---|
| 2,518,895 | 8/1950 | Jacobsson et al. | 239/600 |
| 2,604,361 | 7/1952 | Yates | 239/291 |
| 2,677,416 | 5/1954 | Smith | 239/600 |
| 3,895,757 | 7/1975 | Di Loreto | 239/291 |
| 4,261,516 | 4/1981 | Tillman | 239/291 |
| 4,652,024 | 3/1987 | Krohn | 239/587.1 |
| 4,787,657 | 11/1988 | Henniger | 285/323 |

*Primary Examiner*—J. Casimer Jacyna
*Assistant Examiner*—Steven O. Douglas
*Attorney, Agent, or Firm*—Morton J. Rosenberg; David I. Klein; Jun Y. Lee

[57] ABSTRACT

A versatile air blow-gun is provided which includes a clamping assembly on the mouth of the gun. By use of the clamping assembly, a long scavenge pipe with a head bent at an angle can slide in or out when the clamp is loosened and be fixed at a desired position and direction by locking it. An inflating adapter is screwed on to the end of the air scavenge pipe, which adapter is used for blowing a larger area at a lower air speed to prevent the dirt and the chips from flying up. By means of a shuttling sleeve, a regulating adapter, a spring and a scavenge sleeve, the compressed air is ld from a smaller channel to a bigger one for lowering the blowing air speed and increasing the sweeping area. When the crown bar of the regulation adapter presses against the valve stem of the air valve of the tire, it can inflate the tire.

5 Claims, 12 Drawing Sheets

VERSATILE AIR BLOW-GUN

BACKGROUND OF THE INVENTION

1. Field of the Invention

The present invention relates to a versatile air blow-gun. More particularly, the present invention relates to an air blow-gun with a telescopic scavenge pipe, in which the direction of the air blowing vent is able to be fixed in all directions. By means of an attachment, the present invention is able to sweep diffusely, and also able to inflate tires.

2. Prior Art

The conventional air blow-gun, as shown in FIG. 1, is one of the most common air washing devices used in factories. The air blow-gun is used to do jobs like washing and cleaning spaces easily and conveniently. The conventional air washing arm 10 consists of a gun main holder 12 and a scavenge pipe 11 fixed on the main holder 12. Due to the length of the scavenge pipe 11 of the air washing arm 10 and the fact that it is not exchangeable, the air blowing vent of the scavenge pipe 11 has difficulty reaching some narrow spaces. In addition, as shown in FIG. 1, the flat air washing arm 10, when cleaning the bottom of machines or other lower places, requires the operator to turn his wrist and extend his arm lower, so that the air washing arm can be operated efficiently. However, that will increase the difficulty of the air blow-gun's operation, and in some narrow places there is not enough space to turn the wrist to tilt the air blow-gun and extend the user's hand to the lower place.

A new model of air blow-gun was subsequently developed at a later time, as shown in FIG. 2, in which the air scavenge pipe 21 is exchangeable. By that arrangement, space requirements are met by choosing air scavenge pipes 21 with different length. However, changing of the air scavenge pipe has to be done frequently during a work day, which wastes time. An air blow-gun of this type has to be equipped with multiple air scavenge pipes, such as a shorter and a longer pipe, which increases the production cost and the potential that an air scavenge pipe may be easily lost.

In addition, when cleaning different places and different types of debris, such as dirt and metal chips, the requirements of the sweeping range and air speed are different. Hence, a constant diameter of the air vent of the air scavenge pipe is unable to meet all of the varied requirements.

Besides, in the automobile factories, garages and tire repair shops, the air blow-gun and the tire inflating adapter are both essential tools. But, in many places there is only one compressed air line supplied, therefore the workers have to change between the air blow-gun and the tire inflating adapter frequently. In this case, it takes a lot of time to make that change and such cuts down on the service life of the devices.

SUMMARY OF THE INVENTION

It is therefore one object of this invention to provide a versatile air blow-gun with a telescopic scavenge pipe, in which the direction of the air blowing vent is able to be fixed in various positions. By means of an attachment, like a blowing adapter, the present invention not only blows diffusely, but also inflates tires.

The present invention provides a clamping assembly on the mouth of the gun. By means of the clamping gear, a long scavenge pipe with a bent head at a proper angle can slide in or out when the clamp is released and the scavenge pipe can be set at a desired position and direction, and fixed thereat by locking the clamping gear. An inflating adapter is screwed on the end of the air scavenge pipe, which is used for blowing a larger area at a lower air speed to prevent the dirt and the chips from flying up. By means of a shuttling sleeve, a regulating adapter, a spring and a scavenge sleeve, the compressed air is led from a smaller channel to a bigger one for lowering the blowing air speed and increasing the blowing area. When the crown bar of the regulating adapter presses against the valve stem of a tire, it can inflate the tire.

DETAILED DESCRIPTION OF PREFERRED EMBODIMENTS

Figure 1:
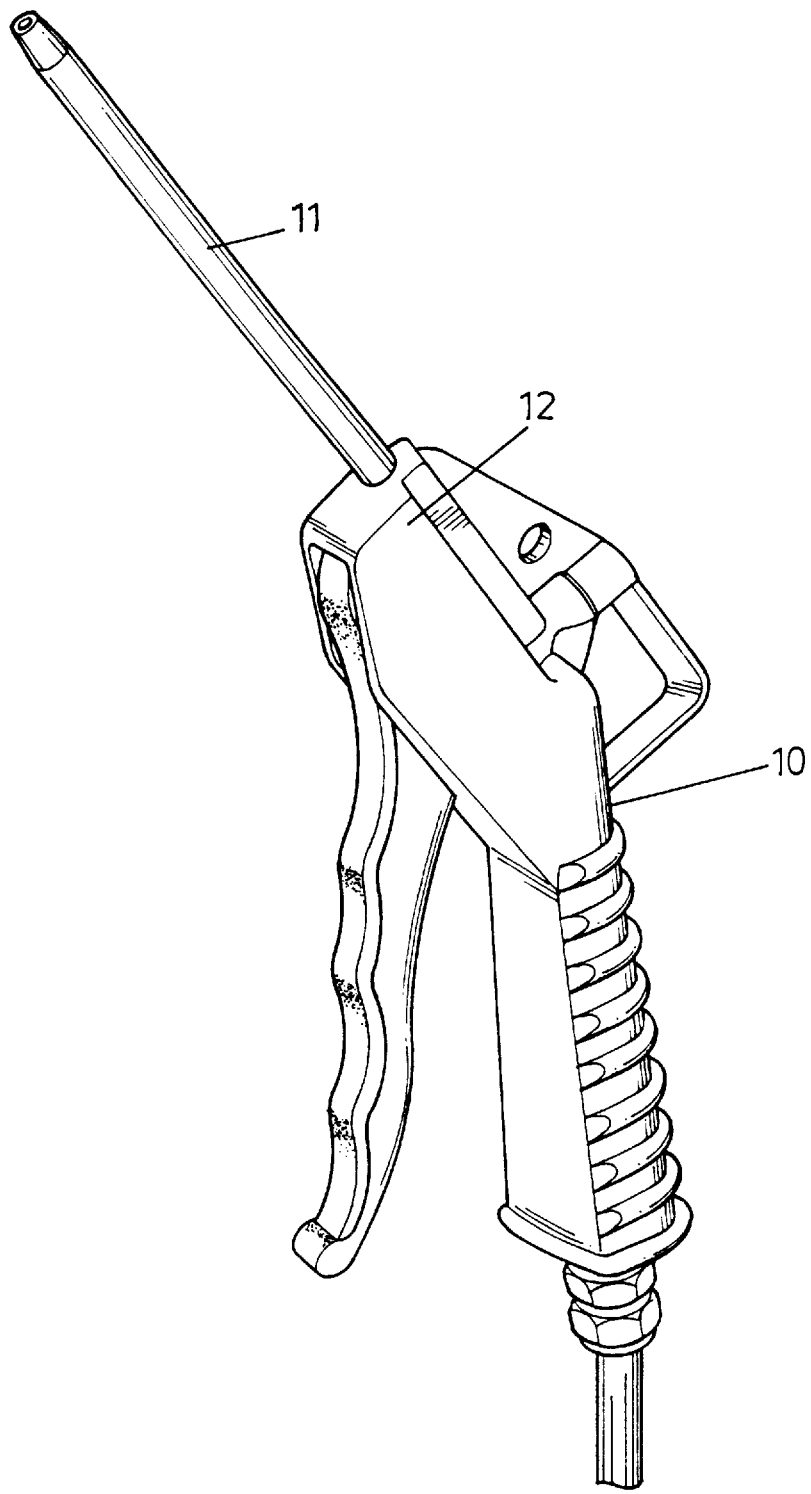
FIG. 1 is a perspective view of a conventional air blow-gun.
Figure 2:
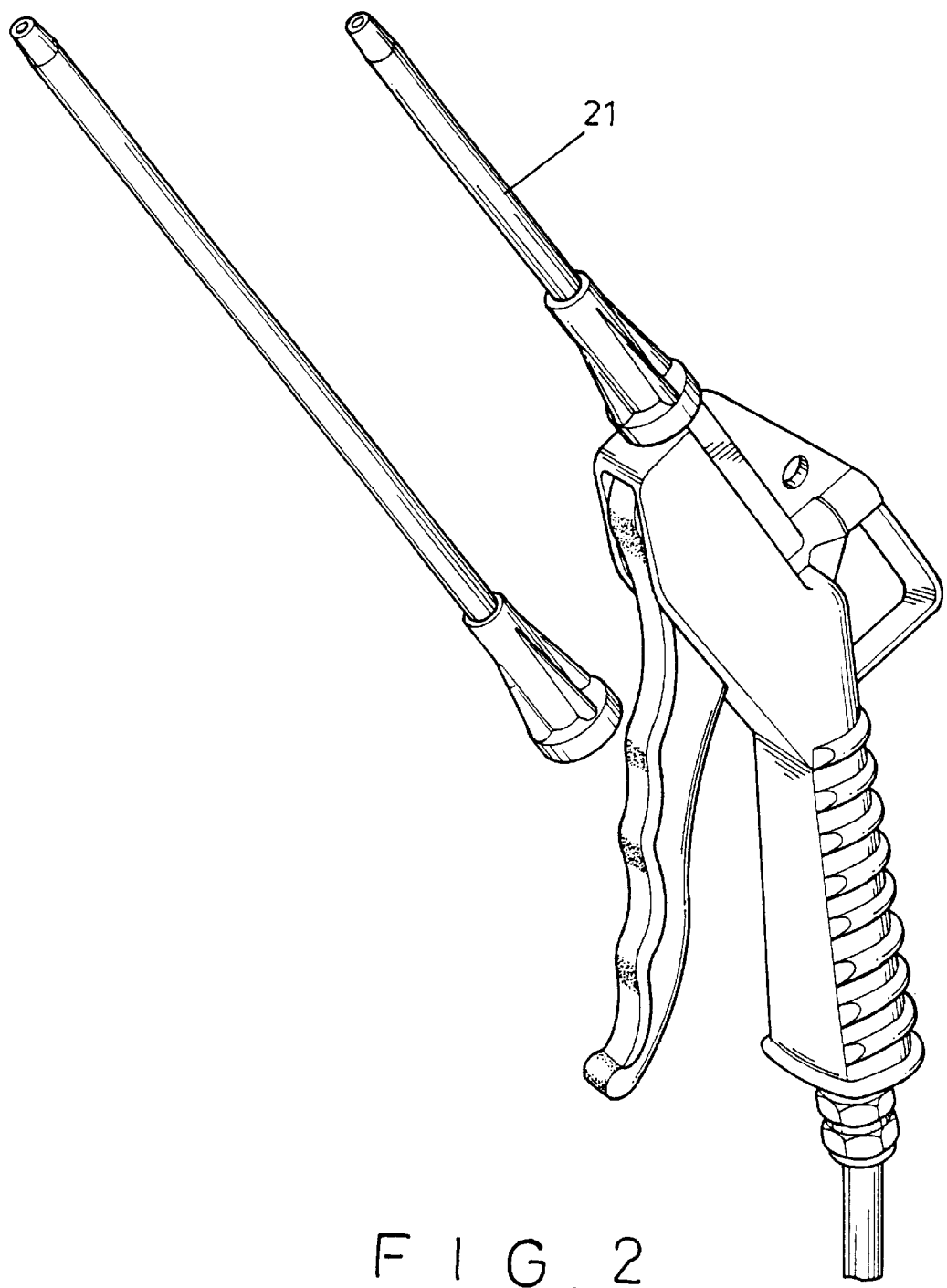
FIG. 2 is a perspective view of a second conventional air blow-gun.
Figure 3:
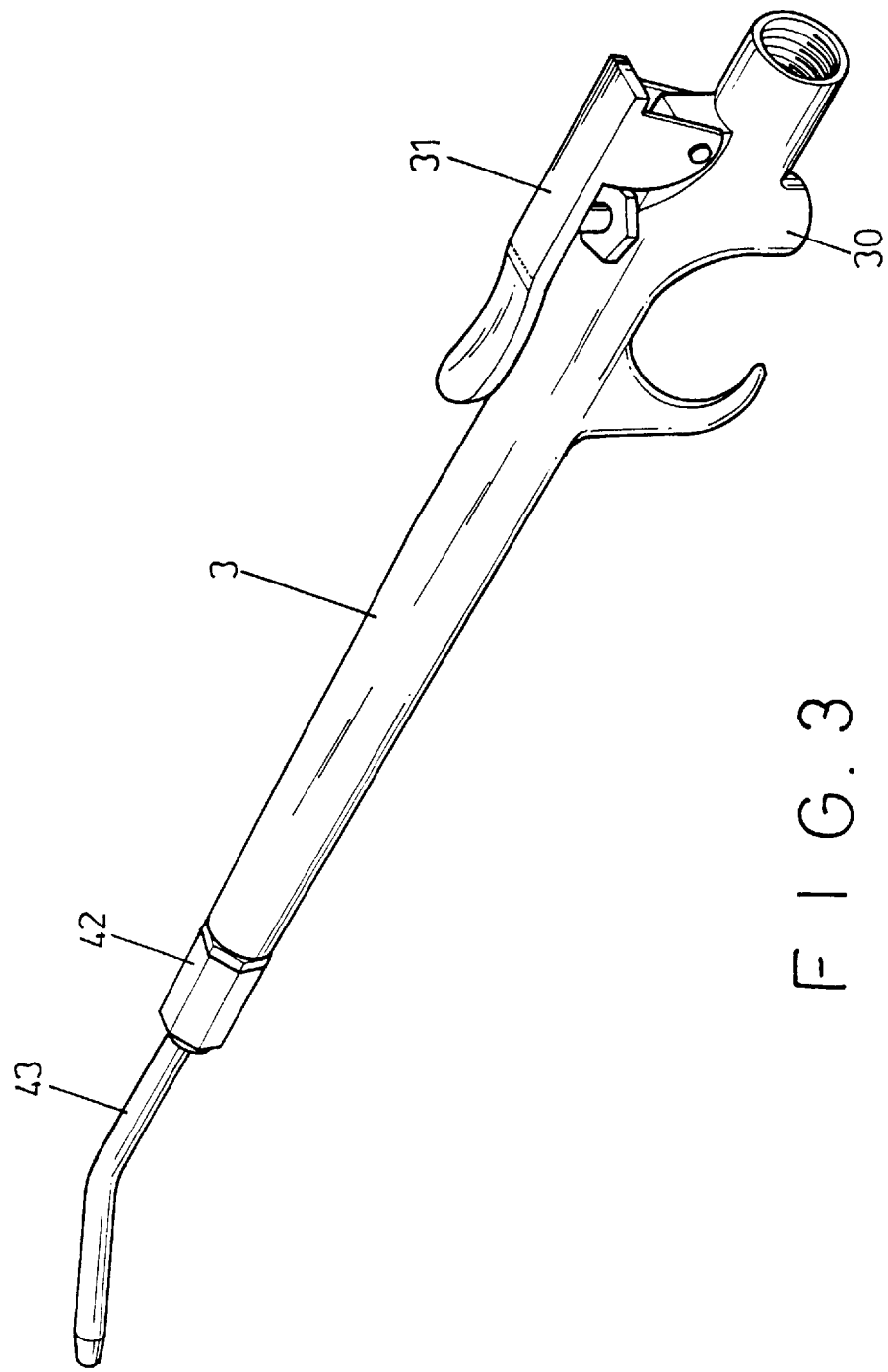
FIG. 3 is a perspective view of the present invention.

Referring to FIGS. 3, 4, 5 and 7, the present invention is essentially composed of a clamping assembly 40 and an inflating adapter 50.

The clamping assembly 40 is secured on an air blow-gun main holder 30, and comprises a clamp 41, a compensating sleeve 42 and an air scavenge pipe 43. The air blow-gun main holder 30 has a trigger 31 pressed on the lift head 321 of an ejector pin 32 and a spring 33 which are sequentially built up at the rear top portion to control fluid communication between an air inlet 35 and a flue 36. By pressing the trigger 31, the spring 33 is urged downwardly by ejector pin 32. When the trigger 31 is released, the spring 33 urges the ejector pin 32 upward. A female thread 38 is formed at the front end of the air scavenge pipe 3 for connecting with a male thread 411 of the clamp 41. Adjacent the inside rim of the female thread 38, a ring-shaped groove 37 is formed for receiving an O ring 39 therein. Cooperating with the aforesaid O ring 39, there is another O ring 39 placed on the root of the male thread 411 of the clamp 41, for sealing the interface and preventing leakage of compressed air. The clamp 41 is a hollow sleeve having a center shaft hole 412 for receiving the air scavenge pipe 43 therein. One end of the clamp 41 is formed with male threads 413 on an outside surface thereof for connecting with the female threads 421 of the compensating sleeve 42. The other end of the clamp 41 has a clamping end with several elastic clamping strips 414 axially extending thereat, which strips are controlled to clamp or free the air scavenge pipe 43 by turning the compensating sleeve 42 in or out. The compensating sleeve 42 has a taper bore 422 for pressing the clamping strips 414 of the clamp 41 inwardly, so as to clamp the air scavenge pipe 43 by adjusting the engaging length of the female thread 421 at the bottom end of compensating sleeve 42 with the male thread 413 of the clamp 41. The air scavenge pipe 43 is a hollow pipe being slidably inserted into the clamp 41 and the flue 36, respectively. Adjacent the inserting end, a collar seat 431 is formed for receiving a spring collar 432 biting on to the scavenge pipe with a split 4321. By means of the spring collar 432, the air scavenge pipe 43 slides into the flue 36 and the clamp 41 smoothly, without any swinging. At an appropriate position, the trunk of the air scavenge pipe 43 is bent at an angle so that the direction of the air vent can be changed by turning the air scavenge pipe 43 to meet the requirements of any narrow space.

Figure 7:
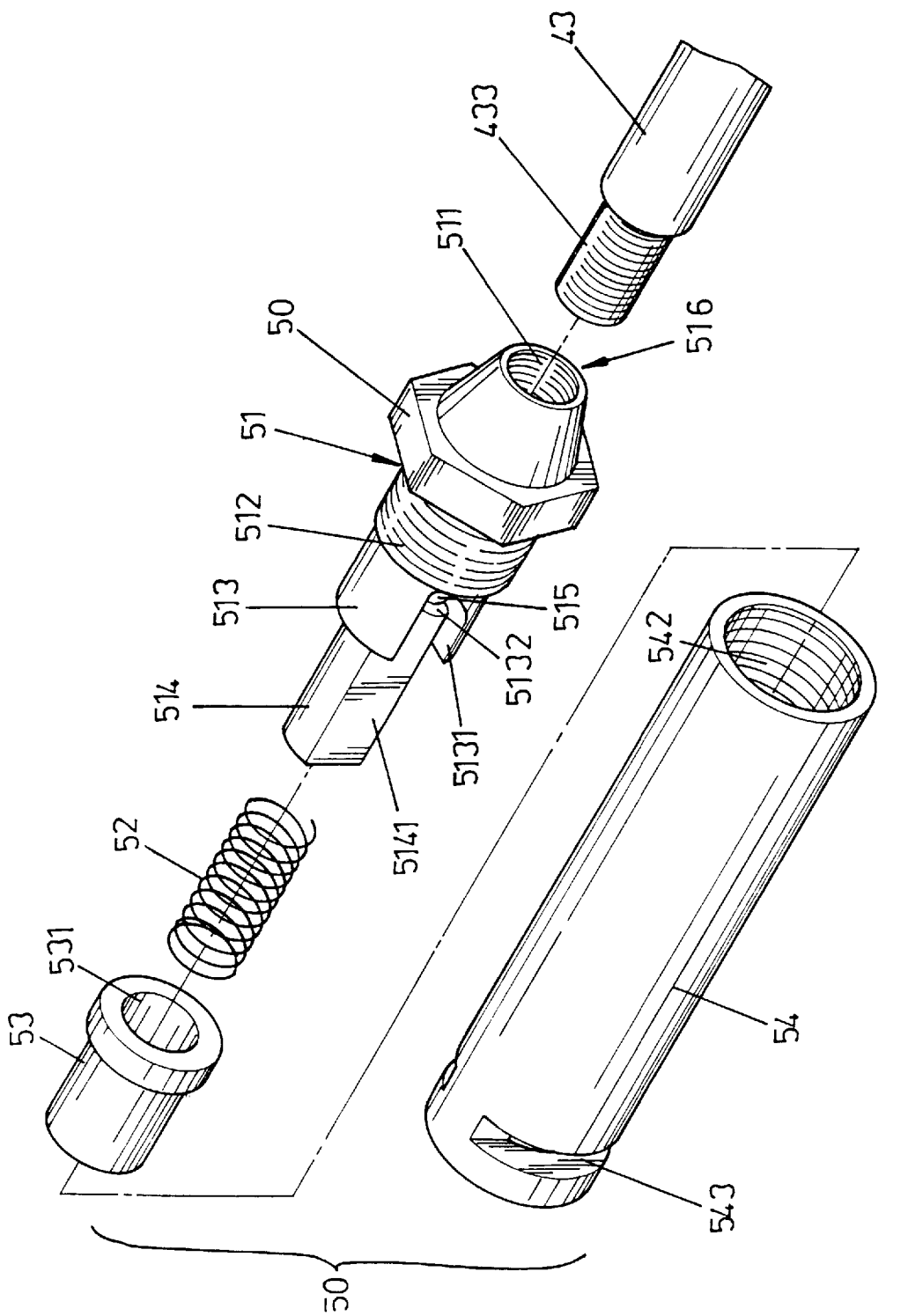
FIG. 7 is an exploded view showing the inflating adapter of the present invention.
Figure 8A:
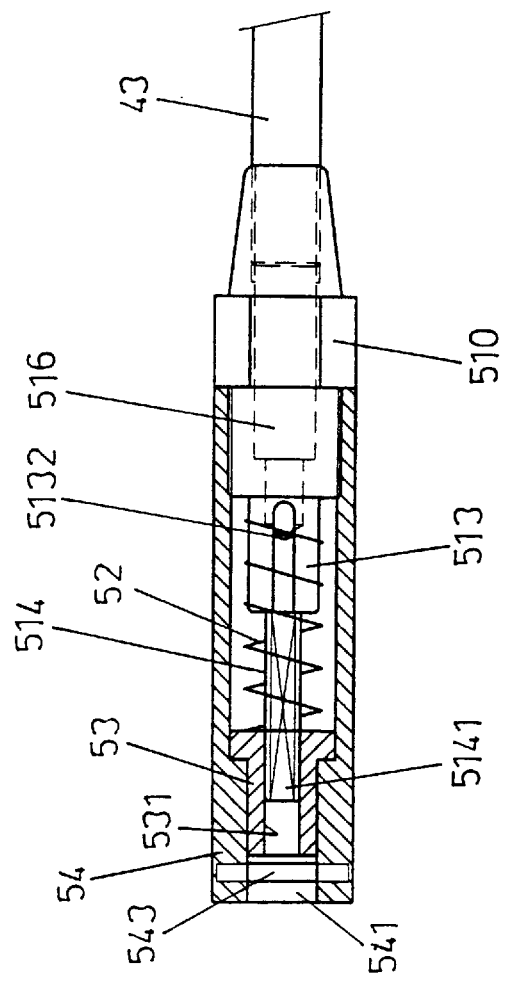
FIG. 8A is a cross-section view showing the inflating adapter of the present invention.
Figure 8B:
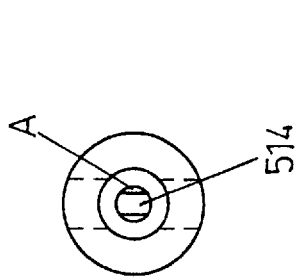
FIG. 8B is a front view of FIG. 8A.

The inflating adapter 50, referring to FIG. 7, FIG. 8A and FIG. 8B, includes a regulating adapter 51, a spring 52, a shuttle sleeve 53 and a scavenge sleeve 54, the assembly connecting to the male thread 433 of the air scavenge pipe 43 with the female thread 511 of regulating adapter 51.

The regulating adapter 51 has a hexagon head 510 at the middle position thereof, a female thread 511 in the inner hole 516 at one side of the hexagon head 510 and a male thread 512 at the other side of hexagon head 510 for connecting to the air scavenge sleeve 54. A post 513 extends from the front end of the male thread 512 for the spring 52 to slide thereon. A crown bar 514 with two opposing cut flats 5141 extends from the front end of the post 513. The two cut flats 5141 extend to the post 513 to form two corresponding guide canals 5131, and at the foot of the guide canals 5131, a transverse through-hole 515 crosses through the inner hole 516. Two chamfers 5132 are formed on both open ends of the crossing through-hole 515, so that the compressed air flows into the guide canals 5131 and flows by the two cut flats 5141. The shuttle sleeve 53 is a cap-shaped sleeve that fits into the internal hole 541 of the air scavenge sleeve 54. The internal hole 531 of shuttle sleeve 53 is sleeved over the crown bar 514 and coordinates with the cut flats 5141 to form two air channels A. The air scavenge sleeve 54 has a stepped internal hole 541, and a female thread 542 at the bottom side thereof for connecting to the regulating adapter 51. Adjacent the front end of the scavenge sleeve 54, one or more slotted through holes 543 are formed for outside air to flow into the air vent of the inner hole 516.

Figure 4:
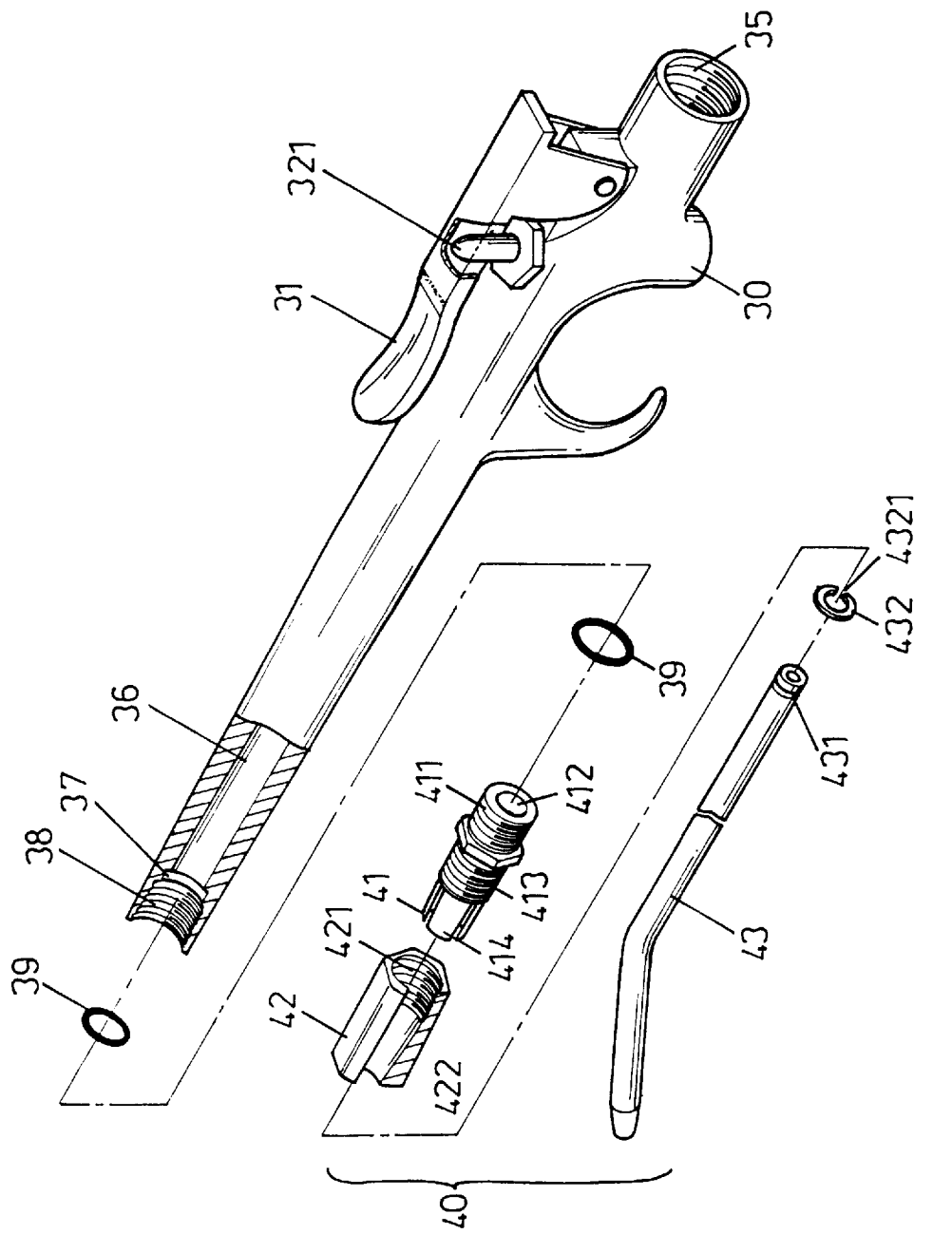
FIG. 4 is an exploded view of the present invention.
Figure 5:
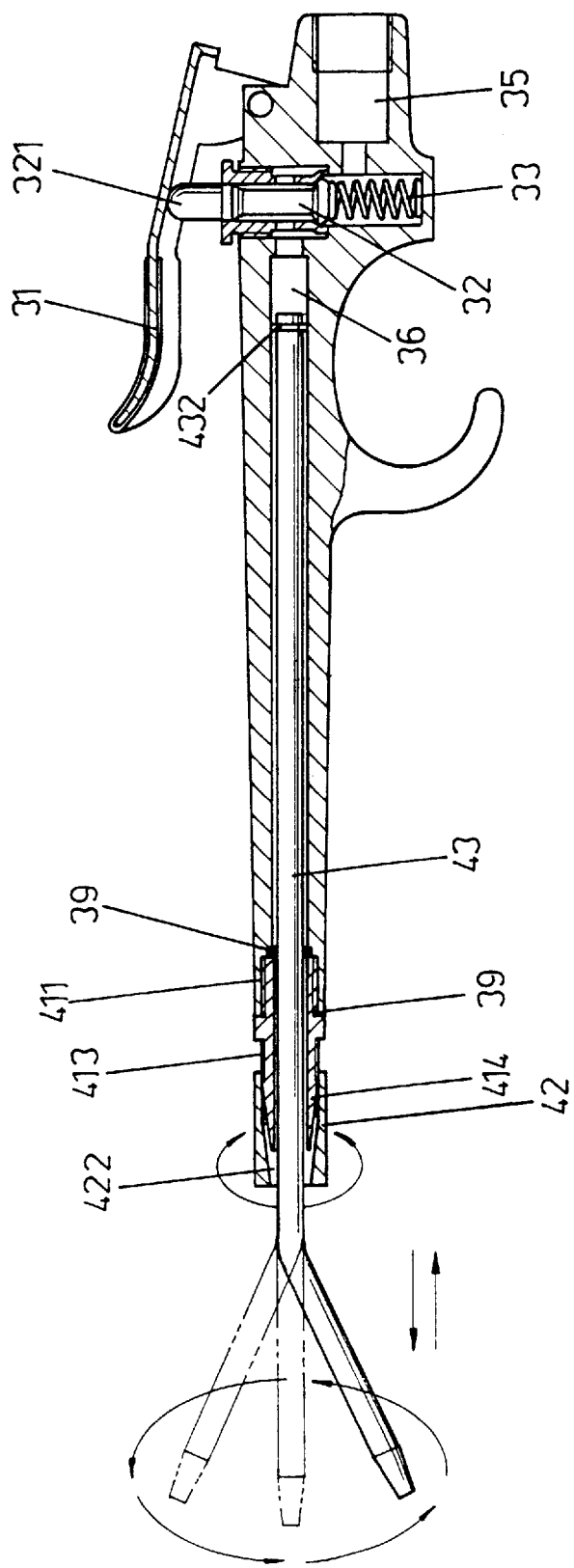
FIG. 5 is a cross-section view showing adjustment of the direction of a vent of an air scavenge pipe of the present invention.
Figure 6:
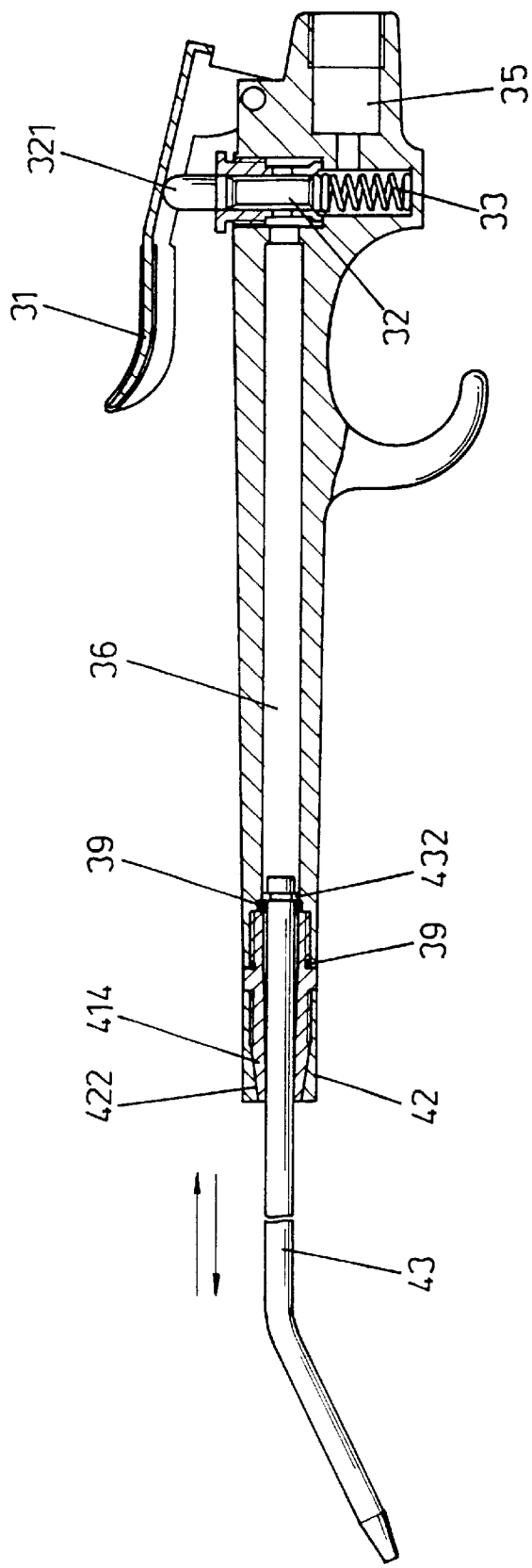
FIG. 6 is a cross-section view showing adjustment of the length of the air scavenge pipe of the present invention.

In practice, to adjust the length and direction of the air scavenge pipe 43, as shown in FIG. 4 and FIG. 5, the compensating sleeve 42 is turned for loosening the clamp 41 on the air scavenge pipe 43, so that the air scavenge pipe 43 can slide in or out to get a desired exposed length and rotated to get a desired direction of the air vent. Then tightening of the compensating sleeve 42 makes use of the taper bore 422 to press the clamping strips 414 of the clamp 41 inwardly to clamp the air scavenge pipe 43. The spring collar 432 biting on the air scavenge pipe 43 can block the air scavenge pipe 43 from sliding out of the clamp 41, and keep in contact with the internal wall of the flue 36 of the main holder 30, as shown in FIG. 6.

Figure 9:
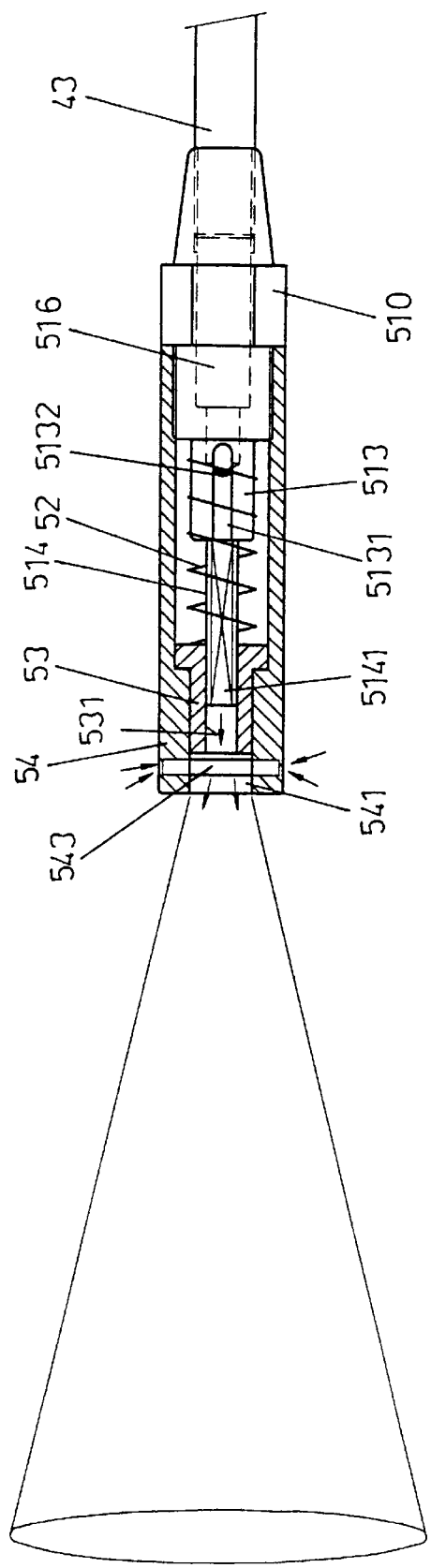
FIG. 9 is a cross-section view showing the action of blowing a bigger area with a lower air speed of the inflating adapter of the present invention.
Figure 10:
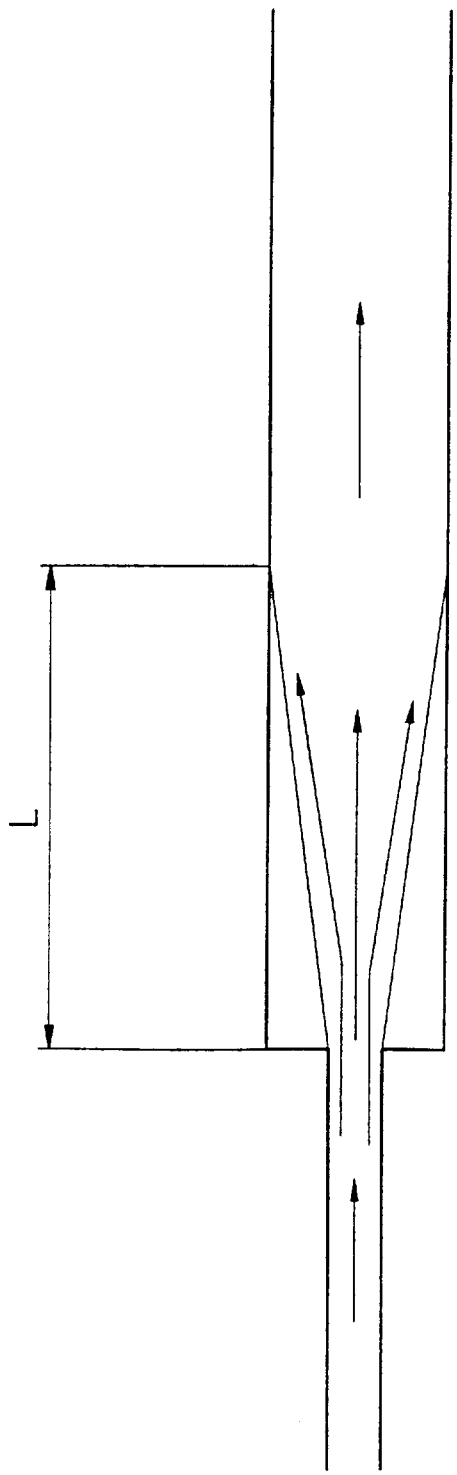
FIG. 10 is a diagram showing the air blow line from the smaller channel to a bigger channel.

When using the inflating adapter 50 to sweep widely with lower speed air or to inflate tires, as shown in FIG. 9, the inflating adapter 50 is mounted on the front end of the air scavenge pipe 43 of the air blow-gun. The compressed air is led from the air scavenge pipe 43 through the inner hole 516 and by means of the chamfers 5132 the air is guided into the guide canals 5131 smoothly. The air flows through the smaller air channels A consisting of the cut flats 5141 of the crown bar 514 and the internal hole 531 of the shuttle sleeve 53 of the inflating adapter 50 to sweep out to a larger outlet. Due to the compressed air flowing out at a high speed, a vacuum will be generated at the slotted holes 543, so that the outside air will be drawn in through the slotted holes 543, flowing into the air vent to mix with the compressed air to decrease the compression ratio and increase the quantity of the sweeping air in order to sweep wider at a lower speed.

Figure 11:
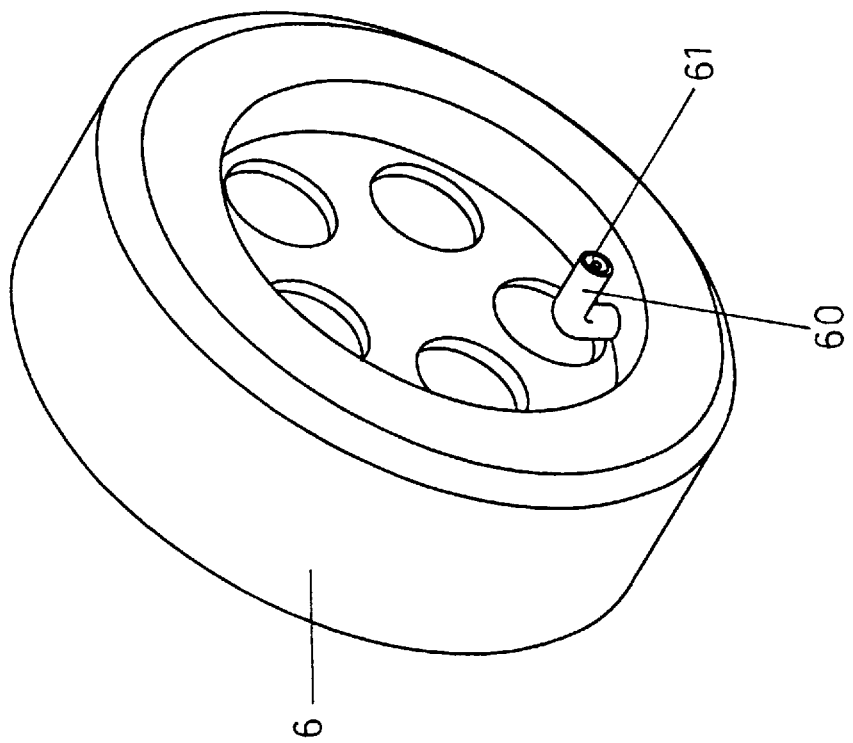
FIG. 11 is a perspective view of a tire.
Figure 12:
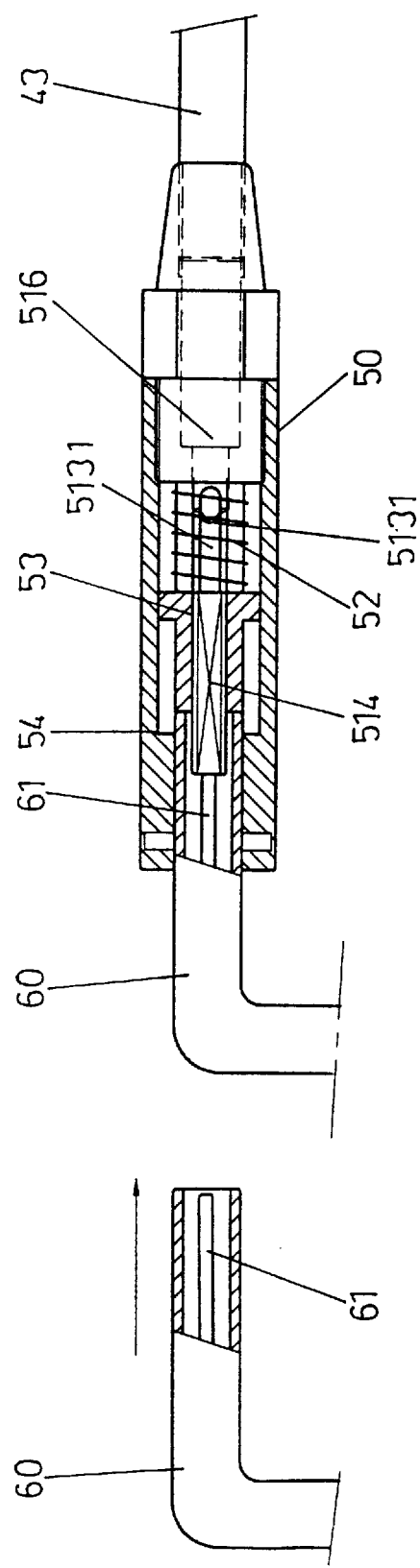
FIG. 12 is a cross-section view showing the inflating operation of the inflating adapter of the present invention.

For inflating a tire, referring to FIG. 11 and FIG. 12, the inflating adapter 50 is placed over the air valve 60 of a tire 6 with the air valve 60 pressing the shuttle sleeve 53 back so that the crown bar 514 extends out from the shuttle sleeve 53 to push the valve stem 61 to let the compressed air blow into the inside of the tire.

I claim:

1. A versatile air blow-gun comprising:

a main holder having an inlet for coupling to a source of compressed air, a scavenging portion having an air passage formed therethrough with a ring-shaped groove formed adjacent a distal end thereof, and a trigger operated valve coupled in fluid communication with said inlet and said air passage for selectively controlling a flow of compressed air therebetween;

an air scavenge pipe having a first end disposed in said air passage and a through bore extending from said first end to an opposing second end thereof, said air scavenge pipe having a collar seat formed therein adjacent said first end thereof, said air scavenge pipe having a portion thereof adjacent said second end bent at an angle;

a spring collar disposed in said collar seat of said air scavenge seat;

clamping means coupled to a distal end of said scavenging portion of said main holder for releasably securing said air scavenge pipe within said air passage, said clamping means including (a) a clamp threadedly engaged to said distal end of said scavenging portion of said main holder and having a through bore in open communication with said air passage, said clamp having a plurality of elastic clamping strips extending axially therefrom (b) an O ring disposed in said ring-shaped groove adjacent said clamp for preventing leakage of compressed air, and (c) a compensating sleeve threadedly engaged to said clamp and having a tapered bore for displacing said plurality of elastic clamping strips to releasably clampingly engage said air scavenge pipe passing through said through bore of said clamp and said tapered bore of said compensating sleeve.

2. The versatile air blow-gun as recited in claim 1 where said spring collar has a split formed therein.

3. The versatile air blow-gun as recited in claim 1 further comprising an inflation adapter, said inflation adapter including (a) a regulating adapter having a first end threadedly engaged to said second end of said air scavenge pipe and a centrally disposed hexagonal head, (b) a tubular scavenge sleeve threadedly coupled to said regulating adapter and having a stepped bore formed therethrough, said regulating adapter having a hole formed in said first end thereof and a post extending from a second end thereof into said stepped through bore of said scavenge sleeve and a crown bar extending from said post within said stepped through bore, said crown bar having a pair of opposing flats formed thereon and extending to said post to form a pair of guide channels, said opposing flats cooperating with said scavenge sleeve to define a pair of air channels therein, said regulating adapter having a transverse through hole extending between said pair of guide channels and in open communication with said hole in said regulating adapter, (c) a spring disposed on said crown bar, and (d) a hat-shaped shuttle sleeve slidingly disposed on said crown bar within said stepped through bore of said scavenge sleeve and biased by said spring.

4. The versatile air blow-gun as recited in claim 3 where said regulating adapter has a pair of chamfers formed respectively at each of the ends of said transverse through hole.

5. The versatile air blow-gun as recited in claim 3 where said scavenge sleeve has at least one slotted opening formed therein for drawing air external to said scavenge sleeve therethrough.

* * * * *